United States Patent
Henry et al.

(10) Patent No.: US 8,595,471 B2
(45) Date of Patent: Nov. 26, 2013

(54) EXECUTING REPEAT LOAD STRING INSTRUCTION WITH GUARANTEED PREFETCH MICROCODE TO PREFETCH INTO CACHE FOR LOADING UP TO THE LAST VALUE IN ARCHITECTURAL REGISTER

(75) Inventors: G. Glenn Henry, Austin, TX (US); Rodney E. Hooker, Austin, TX (US)

(73) Assignee: VIA Technologies, Inc., New Taipei (TW)

(*) Notice: Subject to any disclaimer, the term of this patent is extended or adjusted under 35 U.S.C. 154(b) by 498 days.

(21) Appl. No.: 12/942,440

(22) Filed: Nov. 9, 2010

(65) Prior Publication Data

US 2011/0185155 A1    Jul. 28, 2011

Related U.S. Application Data

(60) Provisional application No. 61/297,519, filed on Jan. 22, 2010.

(51) Int. Cl.
*G06F 9/312* (2006.01)

(52) U.S. Cl.
USPC .......................................... 712/225; 711/137

(58) Field of Classification Search
None
See application file for complete search history.

(56) References Cited

U.S. PATENT DOCUMENTS

| | | | |
|---|---|---|---|
| 5,796,971 A | 8/1998 | Emberson | |
| 6,128,703 A | 10/2000 | Bourekas et al. | |
| 6,470,427 B1 | 10/2002 | Arimilli et al. | |
| 6,775,747 B2 | 8/2004 | Venkatraman | |
| 6,810,466 B2 | 10/2004 | Henry et al. | |
| 6,820,173 B1 | 11/2004 | Bittel et al. | |
| 6,832,296 B2 | 12/2004 | Hooker | |
| 6,981,099 B2 | 12/2005 | Paulraj et al. | |
| 7,080,211 B2 * | 7/2006 | Hooker | 711/137 |
| 7,089,368 B2 | 8/2006 | Hooker | |
| 7,627,740 B2 | 12/2009 | Yasue et al. | |
| 7,707,359 B2 | 4/2010 | Mesard et al. | |
| 2003/0079089 A1 | 4/2003 | Barrick et al. | |
| 2006/0224860 A1 | 10/2006 | Colavin et al. | |
| 2007/0271407 A1 | 11/2007 | Yap et al. | |
| 2008/0216073 A1 | 9/2008 | Yates et al. | |
| 2010/0306503 A1 * | 12/2010 | Henry et al. | 712/207 |

* cited by examiner

*Primary Examiner* — Kenneth Kim

(74) *Attorney, Agent, or Firm* — E. Alan Davis; James W. Huffman

(57) ABSTRACT

A microprocessor invokes microcode in response to encountering a repeat load string instruction. The microcode includes a series of guaranteed prefetch (GPREFETCH) instructions to fetch into a cache memory of the microprocessor a series of cache lines implicated by a string of data bytes specified by the instruction. A memory subsystem of the microprocessor guarantees within architectural limits that the cache line specified by each GPREFETCH instruction will be fetched into the cache. The memory subsystem completes each GPREFETCH instruction once it determines that no conditions exist that would prevent fetching the cache line specified by the GPREFETCH instruction and once it allocates a fill queue buffer to receive the cache line. A retire unit frees a reorder buffer entry allocated to each GPREFETCH instruction in response to completion of the GPREFETCH instruction regardless of whether the cache line specified by the GPREFETCH instruction has been fetched into the cache.

23 Claims, 3 Drawing Sheets

FIG. 2

| CONDITION | MEMORY SUBSYSTEM TREATMENT OF GPREFETCH |
|---|---|
| UNCACHEABLE TRAIT | CAUSE EXCEPTION |
| FILL QUEUE FULL | REPLAY |
| COLLISION WITH STORE OR SNOOP | REPLAY |
| SERIALIZATION SITUATION | REPLAY |
| TLB MISS | CAUSE EXCEPTION (ALTERNATE EMBODIMENT = REPLAY) |

FIG. 3

PSEUDO-CODE OF MICROCODE SEQUENCE USING GPREFETCHES TO PERFORM REP LODS

```
/*
/* IN THIS EXAMPLE, ASSUME:
*       SIZE OF EACH LODS = 1 BYTE
*       CACHE LINE SIZE = 64 BYTES
*/
MAIN()
{
        CHAR *LAST_BYTE_ADDRESS, *SOURCE_ADDRESS;
        INT CACHE_LINE_COUNT;

SOURCE_ADDRESS = EFFECTIVE_ADDRESS (EDS:ESI);
        LAST_BYTE_ADDRESS = SOURCE_ADDRESS + ECX -1;
        CACHE_LINE_COUNT = ECX / 64;
        IF (((ECX % 64) != 0) || ((SOURCE_ADDRESS & 0X3F) != 0))
                ++CACHE_LINE_COUNT;
        /*
         * GUARANTEED PREFETCHES ALL OF THE CACHE LINES IMPLICATED BY
         * THE REP LODS INTO CACHE.
         */
        WHILE (CACHE_LINE_COUNT-- > 0)
        {
                GPREFETCH SOURCE_ADDRESS;
                SOURCE_ADDRESS = SOURCE_ADDRESS + 64;
        }

AL = *LAST_BYTE_ADDRESS;    // LOAD LAST BYTE INTO AL
        ESI = ESI + ECX;            // UPDATE ARCHITECTURAL STATE
        ECX = 0;
}
```

EXECUTING REPEAT LOAD STRING INSTRUCTION WITH GUARANTEED PREFETCH MICROCODE TO PREFETCH INTO CACHE FOR LOADING UP TO THE LAST VALUE IN ARCHITECTURAL REGISTER

CROSS REFERENCE TO RELATED APPLICATION(S)

This application claims priority based on U.S. Provisional Application Ser. No. 61/297,519, filed Jan. 22, 2010, entitled MICROPROCESSOR THAT PERFORMS FAST REPEAT STRING LOADS, which is hereby incorporated by reference in its entirety.

This application is related to U.S. Non-Provisional application Ser. No. 12/781,337, filed May 17, 2010, entitled GUARANTEED PREFETCH INSTRUCTION, which is hereby incorporated by reference in its entirety.

FIELD OF THE INVENTION

The present invention relates in general to the field of microprocessor instruction set architectures, and particularly to repeat string load instructions thereof.

BACKGROUND OF THE INVENTION

The x86 instruction set architecture includes a LODS instruction that loads a byte, word, or dword from a memory location specified by DS:ESI into EAX. The x86 instruction set architecture also includes a REP prefix that allows the program to specify a count in ECX that specifies the number of iterations of the LODS instruction to perform. The ESI register is incremented and the ECX register is decremented on each iteration. (Additionally, there is a mode that decrements, rather than increments, ESI.)

One way to implement REP LODS is in microcode. For example, assuming the REP LODS specifies byte size data (i.e., REP LODSB), the microcode could include a loop whose body loads from the effective address in DS:ESI, increments ESI, and decrements ECX, such that it executes the number of times specified in ECX, such as is shown in the pseudo-code example here in Table 1.

TABLE 1

```
loop:
    load AL, DS:ESI
    inc ESI
    dec ECX
    bnz loop        ; branch to loop if ECX is non-zero
```

Thus, for example, if the initial value of ECX is 8000, then the processor will execute 8000 load instructions.

BRIEF SUMMARY OF INVENTION

In one aspect the present invention provides a microprocessor configured to process a repeat load string instruction, wherein the repeat load string instruction specifies a string of data bytes in memory to be loaded into an architectural register of the microprocessor. The microprocessor includes a memory subsystem having a cache memory. The microprocessor also includes microcode. The microprocessor is configured to invoke the microcode in response to encountering the repeat load string instruction. The microcode includes a series of guaranteed prefetch (GPREFETCH) instructions to fetch into the cache memory a series of cache lines implicated by the string of data bytes specified by the repeat load string instruction. The memory subsystem is configured to guarantee within architectural limits that the cache line specified by each of the GPREFETCH instructions will be fetched into the cache memory.

In another aspect, the present invention provides a method for a microprocessor to process a repeat load string instruction, wherein the repeat load string instruction specifies a string of data bytes in memory to be loaded into an architectural register of the microprocessor. The method includes decoding a repeat load string instruction. The method also includes executing a series of guaranteed prefetch (GPREFETCH) instructions to fetch into the cache memory a series of cache lines implicated by the string of data bytes specified by the repeat load string instruction, in response to said decoding the repeat load string instruction. Executing the series of GPREFETCH instructions comprises guaranteeing within architectural limits that the cache line specified by each of the GPREFETCH instructions will be fetched into the cache memory.

In yet another aspect, the present invention provides a method for loading a data set into a cache memory of a microprocessor. The method includes running a program that includes a repeat load string instruction on the microprocessor. The repeat load string instruction specifies the data set to be loaded into the cache memory. The method includes the microprocessor invoking microcode in response to decoding the repeat load string instruction. The microcode includes a series of guaranteed prefetch (GPREFETCH) instructions to fetch into the cache memory a series of cache lines implicated by the data set specified by the repeat load string instruction. The microprocessor is configured to guarantee within architectural limits that the cache line specified by each of the GPREFETCH instructions will be fetched into the cache memory.

In yet another aspect, the present invention provides a method for loading a data set into a cache memory of a microprocessor. The method includes executing a program that includes a series of guaranteed prefetch (GPREFETCH) instructions. Each of the GPREFETCH instructions is configured to fetch into the cache memory one of a series of cache lines implicated by the data set. The microprocessor is configured to guarantee within architectural limits that the cache line specified by each of the GPREFETCH instructions will be fetched into the cache memory.

In yet another aspect, the present invention provides a computer program product encoded in at least one computer readable medium for use with a computing device, the computer program product comprising computer readable program code embodied in said medium for specifying a microprocessor configured to process a repeat load string instruction, wherein the repeat load string instruction specifies a string of data bytes in memory to be loaded into an architectural register of the microprocessor. The computer readable program code includes first program code for specifying a memory subsystem, comprising a cache memory. The computer readable program code also includes second program code for specifying microcode. The microprocessor is configured to invoke the microcode in response to encountering the repeat load string instruction. The microcode includes a series of guaranteed prefetch (GPREFETCH) instructions to fetch into the cache memory a series of cache lines implicated by the string of data bytes specified by the repeat load string instruction. The memory subsystem is configured to guarantee within architectural limits that the cache line specified by each of the GPREFETCH instructions will be fetched into the cache memory.

BRIEF DESCRIPTION OF THE DRAWINGS

FIG. 2 is a table listing the action performed by the memory subsystem of FIG. 1 when executing a gprefetch instruction under various circumstances.

FIG. 3 is a pseudo-code listing of a portion of the fast load string microcode of the microprocessor of FIG. 1.

DETAILED DESCRIPTION OF THE INVENTION

Described herein are embodiments of a microprocessor that includes in its instruction set a guaranteed prefetch (GPREFETCH or gprefetch) instruction that may be used by microcode to implement a repeat load string instruction, such as an x86 REP LODS, in a much faster manner than the microcode shown above. A beneficial use of an implementation of the REP LODS that uses gprefetch instructions as described in the embodiments herein is that it provides an extremely fast way for a program to fetch a contiguous data set specified by the program from system memory into the data cache of the microprocessor.

As may be observed from the conventional microcode loop of Table 1 described above, the AL register gets clobbered by each subsequent load instruction such that the source data specified by the last load instruction ends up in AL. Thus, it would appear that the REP LODS is not a very useful instruction and the same purpose could be accomplished, with respect to the final value of AL, by a single LODS instruction specifying the last byte of the string as the source address, an instruction that loads zero into ECX, and an instruction that loads into ESI the address of the next memory location after the last byte of the string. However, like most microprocessor architectures, the x86 architecture allows system software to specify cacheable regions of memory. The processor is allowed to access memory to fetch entire cache lines implicated by program memory accesses, such as generated by a REP LODS. Thus, even though AL is being clobbered on each iteration, if the string specified by the REP LODS is in a cacheable region, then a side effect of the REP LODS is that the processor will likely fetch into the cache each missing cache line of the string.

Figure 1:
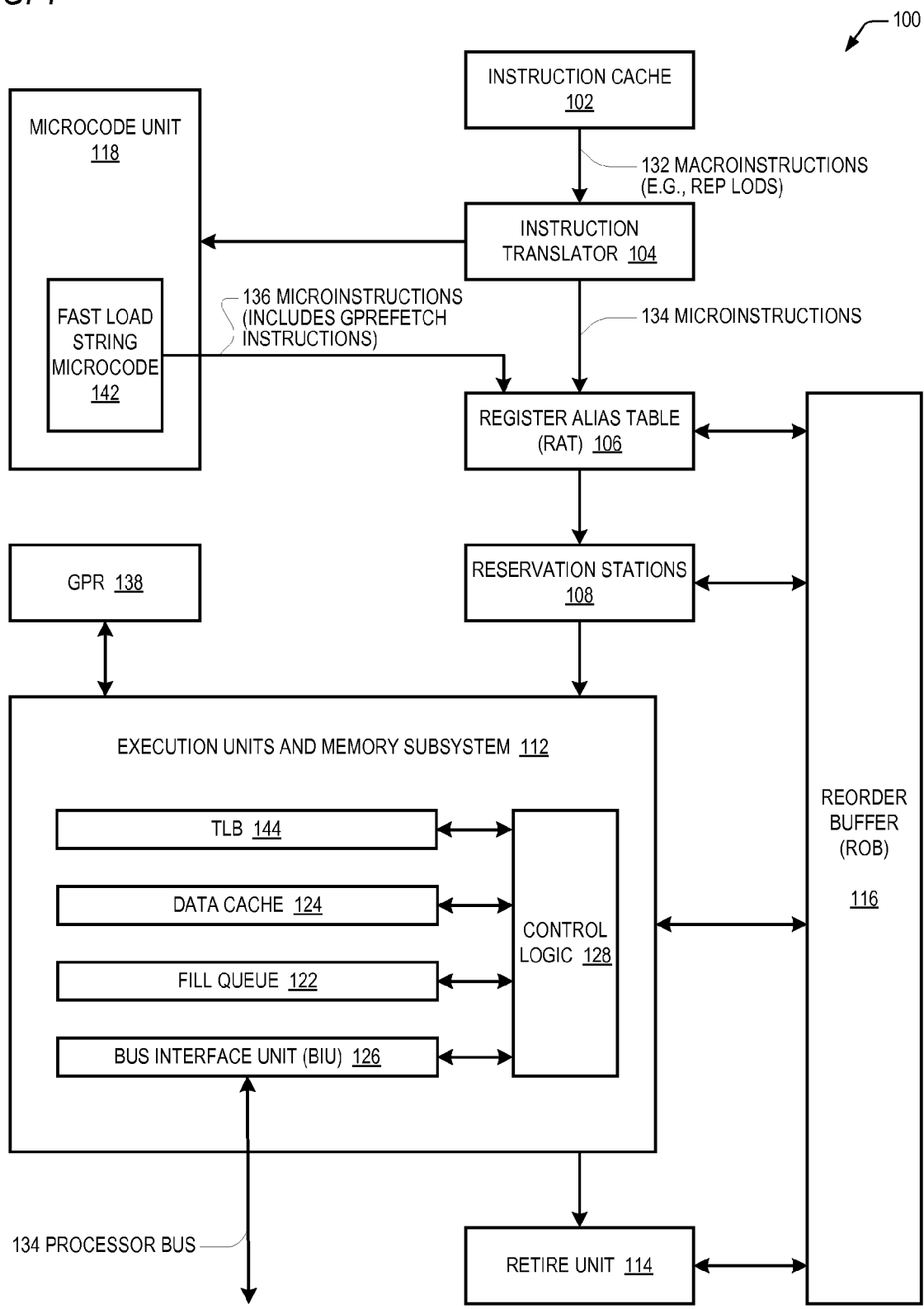
FIG. 1 is a block diagram illustrating a microprocessor according to the present invention.

Referring now to FIG. 1, a block diagram illustrating a microprocessor 100 according to the present invention is shown. The microprocessor 100 is a pipelined microprocessor that includes an instruction cache 102 that caches program instructions, also referred to herein as macroinstructions 132. The instruction cache 102 provides the macroinstructions 132 to an instruction translator 104. The instruction translator 104 decodes each macroinstruction 132 and translates most macroinstructions 132 into one or more microinstructions 134. The translated microinstructions 134 may include a normal prefetch instruction, which is treated only as a hint by the microprocessor 100. The instruction translator 104 is further configured to know that some of the macroinstructions 132 are implemented in microcode 142 of a microcode unit 118 of the microprocessor 100. When the instruction translator 104 encounters a macroinstruction 132 that is implemented in microcode 142, the instruction translator 104 transfers control to a microsequencer (not shown) of the microcode unit 118, which fetches microinstructions 136 of the microcode 142 from a microcode memory (not shown) of the microcode unit 118 and dispatches the microinstructions 136 for execution. In particular, the microcode 142 includes code (referred to herein as fast load string microcode 142) for implementing a repeat string load macroinstruction 132, such as an x86 architecture REP LODS instruction, using gprefetch microinstructions. The microinstructions 136 may include load and gprefetch microinstructions, among others.

A register alias table (RAT) 106 receives both the translated microinstructions 134 from the instruction translator 104 and the microcode 142 microinstructions 136 from the microcode unit 118 and generates dependencies of the microinstructions 134/136. In one embodiment, the microprocessor 100 is an out-of-order execution microprocessor, and the RAT 106 is the last portion of the microprocessor 100 pipeline that receives instructions in program order. The RAT 106 incorporates the program order of the instructions, which is used by a reorder buffer (ROB) 116 to retire the instructions 134/136 in program order. The RAT 106 allocates an entry in the ROB 116 for each instruction 134/136 in program order before dispatching it to the reservation stations 108. The ROB 116 is coupled to the RAT 106, the reservation stations 108, execution units and memory subsystem 112, and a retire unit 114.

The reservation stations 108 receive microinstructions 134/136 from the RAT 106 and issue the microinstructions 134/136 to the execution units 112 as their source operands become available based on the dependency information generated by the RAT 106 and as the execution units 112 become available. The microprocessor 100 also includes general purpose registers 138, which include the x86 AL, ECX, EDI and ESI registers in the x86 embodiment. The retire unit 114 retires microinstructions 134/136 in program order as identified by their order in the ROB 116. In particular, the retire unit 114 examines flags in the entry of the oldest instruction in the ROB 116 to determine whether the instruction 134/136 needs to be replayed or whether an exception needs to be raised.

The memory subsystem 112 includes a translation lookaside buffer (TLB) 144, a data cache 124, a fill queue 122, a bus interface unit (BIU) 126, and control logic 128 coupled to control the TLB 144, data ache 124, fill queue 122, and bus interface unit 126. The bus interface unit 126 interfaces the microprocessor 100 to a processor bus that is coupled to the system memory (not shown) of the computer system in which the microprocessor 100 resides. The system memory, among other things, is storing a string of data bytes to be loaded by a repeat string load instruction from a source address into a destination register, e.g., the x86 AL register. The TLB 144 caches virtual to physical address translations for memory pages. The data cache 124 caches data read from the system memory, such as the string data of a repeat load string instruction. The fill queue 122 has a finite number of cache line buffers, each separately allocatable by the memory subsystem 112 for receiving a cache line read from system memory by the bus interface unit 126, such as a cache line of string data specified by a repeat load string instruction that is prefetched by a gprefetch instruction. In one embodiment, the number of fill queue 122 buffers is twelve.

The memory subsystem 112 executes gprefetch instructions, normal prefetch instructions, and load instructions, among others. In some situations, the memory subsystem 112 may want to cause the microprocessor 100 to replay an instruction, such as a gprefetch instruction, or to cause the microprocessor 100 to raise an exception in response to an instruction, such as a gprefetch instruction, as shown in the table of FIG. 2. To accomplish a replay, the memory subsystem 112 sets a flag in the gprefetch's ROB entry to indicate that the gprefetch must be replayed. Subsequently, when the gprefetch is ready to retire (i.e., is the oldest instruction in the ROB 116), the ROB 116 replays the gprefetch and all instructions newer than it back to the reservation stations 108 such that their source operands are re-fetched and they are re-issued to the execution units and memory subsystem 112 for execution. To accomplish an exception, the memory subsystem 112 sets a flag in the gprefetch's ROB entry to indicate that the gprefetch caused an exception condition. Subsequently, when the gprefetch is ready to retire, the ROB 116 raises an exception, which is handled by an exception handler in the microcode, which communicates the exception condition to the fast string load microcode 142.

Gprefetch is different from a normal prefetch in that it guarantees it will fetch the specified cache line into the data cache in almost any condition permitted by the architecture.

Referring now to FIG. 2, a table listing the action performed by the memory subsystem 112 when executing a gprefetch instruction under various circumstances is shown, which is also described here.

(1) If the memory trait of the page being addressed by the gprefetch is an uncacheable trait, then the memory subsystem does not prefetch the cache line, since the architecture does not permit it, but instead causes the gprefetch instruction to generate an exception so that the microcode can perform the repeat string load in a normal, i.e., non-prefetching, fashion.

(2) If the fill queue 122 is full, the memory subsystem 112 will cause the gprefetch to be replayed until it successfully allocates a fill queue 122 entry.

(3) If the gprefetch collides with a store or snoop, the memory subsystem 112 will cause the gprefetch to be replayed until it no longer collides.

(4) If the memory subsystem 112 encounters a serialization situation (e.g., the prefetch is behind a serializing instruction, such as a locked operation), it will replay the gprefetch.

(5) If the gprefetch virtual address misses in the TLB 144, the memory subsystem 112 does not prefetch the cache line and will cause the gprefetch instruction to generate an exception. In an alternate embodiment, the memory subsystem 112 performs the tablewalk and replays the gprefetch instruction in response to the TLB miss.

Referring now to FIG. 3, a pseudo-code listing of a portion of the fast load string microcode 142 of the microprocessor 100 of FIG. 1 is shown. In the example, it is assumed that the size specified by the REP LODS is one byte, e.g., a REP LODSB, and that the size of a cache line is 64 bytes. First the code calculates the effective address specified in the x86 EDS:ESI registers and assigns it to a source_address variable. The code then calculates the memory address of the last byte of the string to be loaded by adding the source_address value to the value specified in ECX (which specifies the number of bytes in the string) less one and assigning it to a last_byte_address variable. The code then calculates the number of cache lines as the number of bytes of the string (specified in ECX) divided by the cache line size and assigning it to a variable cache_line_count. Additionally, the code increments the cache_line_count if the number of bytes is not an integer multiple of the cache line size or the string does not begin on a cache line boundary.

The code then loops performing a gprefetch to the source_address and incrementing the source_address by the size of a cache line. The loop thus guarantees that all cache lines implicated by the string specified by the REP LODS are prefetched into the data cache 124. It is noted that in one embodiment, the loop of gprefetch instructions is unrolled into a series of sequential gprefetch instructions, and the code jumps into the appropriate location within the unrolled series of sequential gprefetch instructions based on the cache_line_count value.

Finally, the code loads the byte at the last_byte_address into the AL register and updates the architectural state to its proper value upon execution of the REP LODSB, i.e., the ECX (value is added to ESI and ECX is assigned the value zero.

Interrupts are disabled from being taken during the execution of the code shown in FIG. 3.

Since AL is going to get clobbered and only the last byte of data from the string is going to be visible in AL, as may be observed, the microcode 142 advantageously does not actually load a value into AL until the end.

Figure 4:
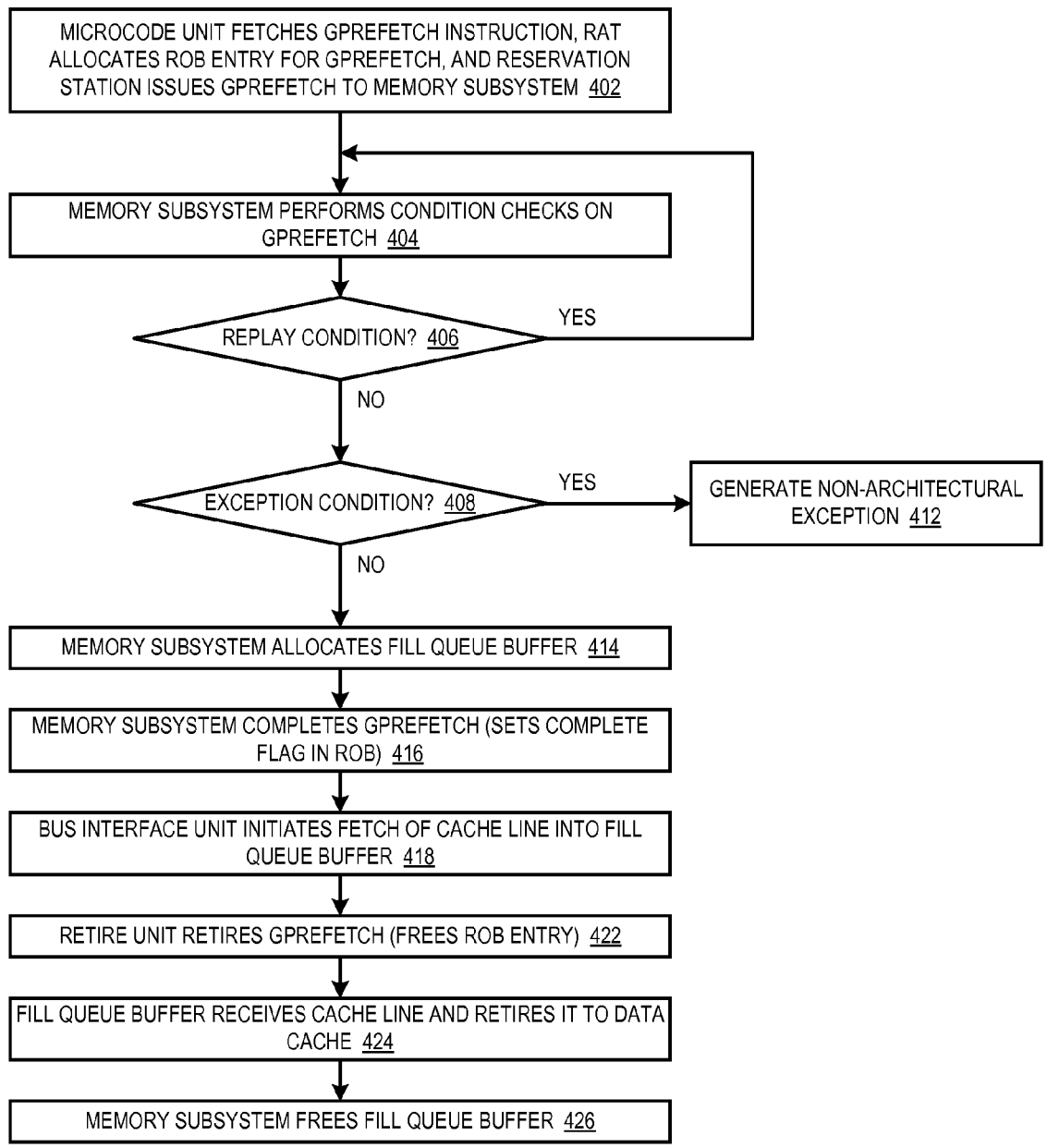
FIG. 4 is a flowchart illustrating operation of the microprocessor of FIG. 1 to process a gprefetch instruction according to the present invention.

Referring now to FIG. 4, a flowchart illustrating operation of the microprocessor 100 of FIG. 1 to process a gprefetch instruction according to the present invention is shown. Flow begins at block 402.

At block 402, the microcode unit 118 fetches a gprefetch instruction from the microcode ROM, the RAT 106 allocates an entry in the ROB 116 for the gprefetch instruction, and the reservation station 108 issues the gprefetch instruction to the memory subsystem 112 for execution. Flow proceeds to block 404.

At block 404, the memory subsystem 112 performs condition checks on the gprefetch instruction. In particular, the memory subsystem 112 checks for any of the conditions specified in the table of FIG. 2. Flow proceeds to decision block 406.

At decision block 406, the memory subsystem 112 determines whether the gprefetch instruction has caused a replay condition. Replay conditions include, but are not limited to: the fill queue 122 is full; a TLB 144 miss occurred, which requires a page table walk; the gprefetch address-collides with a store or snoop; the memory subsystem 112 encounters a serialization situation. If the gprefetch instruction has caused a replay condition, flow returns to block 404; otherwise, flow proceeds to decision block 408.

At decision block 408, the memory subsystem 112 determines whether the gprefetch instruction has caused an exception condition. Exception conditions include, but are not limited to: the gprefetch is accessing a memory region with an uncacheable trait; a TLB 144 miss occurred. If the gprefetch instruction has caused an exception condition, flow proceeds to block 412; otherwise, flow proceeds to block 414.

At block 412, the memory subsystem 112 sets an exception flag in gprefetch ROB 116 entry so that when the gprefetch instruction is ready to retire, the ROB 116 will cause a non-architectural exception, which will be handled by an exception handler in the fast string load microcode 142. In the case that the gprefetch is accessing a memory region with an uncacheable trait, the microcode 142 reverts to a non-prefetching routine similar to the conventional code described in Table 1 above. In the case that the gprefetch caused a TLB 144 miss, the microcode 142 will cause a page tablewalk and then resume the fast string load code of FIG. 3. Flow ends at block 412.

At block 414, the memory subsystem 112 allocates a fill queue 122 buffer for the gprefetch instruction. Flow proceeds to block 416.

At block 416, the memory subsystem 112 completes the gprefetch instruction. That is, the memory subsystem 112 sets a complete flag in the ROB 116 entry for the gprefetch instruction. Flow proceeds to block 418.

At block 418, the BIU 126 initiates a transaction on the bus 134 to fetch the cache line specified by the gprefetch instruction into the fill queue 122 buffer that was allocated at block 414. Flow proceeds to block 422.

At block 422, the gprefetch instruction becomes the oldest instruction in the microprocessor 100 and the retire unit 114 responsively retires the gprefetch instruction. That is, the retire unit 114 frees up the ROB 116 entry that was allocated for it at block 402. Flow proceeds to block 424.

At block 424, the fill queue 122 buffer receives the cache line from the BIU 126 in response to the bus 134 transaction that was initiated at block 418. The fill queue 122 then retires the cache line into the data cache 124. Flow proceeds to block 426.

At block 426, the memory subsystem 112 frees up the fill queue 122 buffer that was allocated at block 414. Flow ends at block 426.

As may be observed from the forgoing, the embodiments for performing a fast REP LODS described herein using gprefetch instructions are performed by the microprocessor 100 potentially much faster than a conventional approach, such as the approach taken by the code of Table 1 above. The code of Table 1 will cause the microprocessor 100 to fetch, issue, and execute many small load instructions. Upon a load miss in the data cache 124, execution within the microprocessor 100 pipeline will grind to a halt waiting for the missing load data (only to be ultimately overwritten in the destination register, except for the very last load), and the ROB 116, which has a finite number of entries, will contain many loads to the same cache line. In this scenario, the bus 134 will be active with a very small number of cache line allocations (e.g., one or two), in the best case.

In contrast to the conventional approach, the fast load string microcode 142 takes advantage of the fact that there are many cache lines to fetch and the fact that the data for all but the last load is overwritten in the destination register. In light of these facts, the fast load string microcode 142 performs a series of gprefetch instructions, which do not stall the microprocessor 100 pipeline unless they cause a replay or exception condition, e.g., the memory subsystem 112 is unable to allocate a fill queue 122 entry. Additionally, because of the brevity of the gprefetch instruction to describe an entire cache line worth of load data, many cache lines are represented at once within the ROB 116 at a time. This equates to a bus 134 that is fully utilized, with a relatively very large number of cache line allocations outstanding at any one time, versus the relatively small number for the conventional case.

As may be observed from the embodiments described herein, when a program wants to fetch a particular contiguous data set from system memory into the data cache 124 of the microprocessor 100 in an extremely efficient manner, it may advantageously do so by simply including a REP LODS that specifies the contiguous data set.

In an alternate embodiment, the microprocessor 100 instruction set architecture is modified to include the GPREFETCH instruction. Thus, the user code that loads the cache with the data set would be similar to the microcode shown in FIG. 3, rather than using a REP LODS. It is noted that if the goal of the program is simply to load the cache with the data set, then the instructions near the end of the pseudocode of FIG. 3 need not be present, i.e., the code that updates the architectural state affected by a REP LODS instruction (i.e., the AL, ESI, and ECX registers).

Because the gprefetch instruction does not load data into an architectural register of the microprocessor 100, advantageously the memory subsystem 112 completes the gprefetch instruction, thereby freeing up resources in the memory subsystem 112, once it determines that none of the conditions exist that would prevent it from fetching the cache line specified by the gprefetch instruction and allocates a fill queue 122 cache line buffer for the cache line (as discussed with respect to block 414 of FIG. 4). Furthermore, the retire unit 114 retires the gprefetch instruction as soon as it is the oldest instruction in the microprocessor 100, which advantageously frees up the entry in the ROB 116 that was previously allocated to the gprefetch instruction (as discussed with respect to block 422 of FIG. 4).

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor configured to process a repeat load string instruction, wherein the repeat load string instruction specifies a string of data bytes in memory to be loaded into an architectural register of the microprocessor, the microprocessor comprising:
   a memory subsystem, comprising a cache memory; and
   microcode, wherein the microprocessor is configured to invoke the microcode in response to encountering the repeat load string instruction, wherein the microcode includes a series of guaranteed prefetch (GPREFETCH) instructions to fetch into the cache memory a series of cache lines implicated by the string of data bytes specified by the repeat load string instruction;
   wherein the microcode further includes an instruction to load a last value from the string of data bytes into the architectural register.

2. The microprocessor of claim 1, wherein the GPREFETCH instruction does not load data into an architectural register of the microprocessor.

3. The microprocessor of claim 1, wherein the memory subsystem completes the GPREFETCH instruction once it determines that no conditions exist that would prevent the microprocessor from fetching the cache line specified by the GPREFETCH instruction and once it allocates a fill queue buffer to receive the cache line.

4. The microprocessor of claim 3, wherein conditions that would prevent the microprocessor from fetching the cache line specified by the GPREFETCH instruction include that the cache line is in a region of memory having an uncacheable memory trait.

5. The microprocessor of claim 3, wherein conditions that would prevent the microprocessor from fetching the cache line specified by the GPREFETCH instruction include that the cache line causes a miss in a translation lookaside buffer of the microprocessor.

6. The microprocessor of claim 1, further comprising:
a reorder buffer, comprising a queue of instruction entries for storing information regarding outstanding instructions currently being processed by the microprocessor, wherein the microprocessor employs the reorder buffer to maintain program order of the instructions; and
a retire unit, configured to free the reorder buffer entry allocated to each of the GPREFETCH instructions regardless of whether the cache line specified by the GPREFETCH instruction has been fetched into the cache memory.

7. The microprocessor of claim 1, wherein the repeat load string instruction is an x86 architecture REP LODS instruction.

8. The microprocessor of claim 1, wherein the memory subsystem is configured to replay the GPREFETCH instruction if a fill queue of the microprocessor is full.

9. The microprocessor of claim 1, wherein the memory subsystem is configured to replay the GPREFETCH instruction if the address of the cache line specified by the GPREFETCH instruction collides with a snoop operation.

10. The microprocessor of claim 1, wherein the memory subsystem is configured to replay the GPREFETCH instruction if the GPREFETCH instruction follows a serializing instruction.

11. A method for loading a data set into a cache memory of a microprocessor, the method comprising:
executing a program that includes a series of guaranteed prefetch (GPREFETCH) instructions, wherein each of the GPREFETCH instructions is configured to fetch into the cache memory one of a series of cache lines implicated by the data set;
wherein the program also includes an instruction to load a last value from the string of data bytes into the architectural register.

12. A method for a microprocessor to process a repeat load string instruction, wherein the repeat load string instruction specifies a string of data bytes in memory to be loaded into an architectural register of the microprocessor, the method comprising:
decoding a repeat load string instruction;
executing a series of guaranteed prefetch (GPREFETCH) instructions to fetch into the cache memory a series of cache lines implicated by the string of data bytes specified by the repeat load string instruction, in response to said decoding the repeat load string instruction; and
executing an instruction to load a last value from the string of data bytes into the architectural register.

13. The method of claim 12, wherein microcode of the microprocessor comprises the series of GPREFETCH instructions.

14. The method of claim 12, wherein the GPREFETCH instruction does not load data into an architectural register of the microprocessor.

15. The method of claim 12, further comprising:
completing each of the GPREFETCH instructions once the microprocessor determines that no conditions exist that would prevent the microprocessor from fetching the cache line specified by the GPREFETCH instruction and once the microprocessor allocates a fill queue buffer to receive the cache line.

16. The method of claim 12, further comprising:
freeing a reorder buffer entry allocated to each of the GPREFETCH instructions, in response to completion of the GPREFETCH instruction regardless of whether the cache line specified by the GPREFETCH instruction has been fetched into the cache memory.

17. The method of claim 12, wherein the repeat load string instruction is an x86 architecture REP LODS instruction.

18. A method for loading a data set into a cache memory of a microprocessor, the method comprising:
running a program that includes a repeat load string instruction on the microprocessor, wherein the repeat load string instruction specifies the data set to be loaded into the cache memory;
invoking microcode, by the microprocessor, in response to decoding the repeat load string instruction, wherein the microcode includes a series of guaranteed prefetch (GPREFETCH) instructions to fetch into the cache memory a series of cache lines implicated by the data set specified by the repeat load string instruction;
wherein the microcode further includes an instruction to load a last value from the string of data bytes into the architectural register.

19. The method of claim 18, wherein the repeat load string instruction is an x86 architecture REP LODS instruction.

20. The method of claim 18, further comprising:
completing each of the GPREFETCH instructions once the microprocessor determines that no conditions exist that would prevent the microprocessor from fetching the cache line specified by the GPREFETCH instruction and once the microprocessor allocates a fill queue buffer to receive the cache line.

21. The method of claim 18, further comprising:
freeing a reorder buffer entry allocated to each of the GPREFETCH instructions, in response to completion of the GPREFETCH instruction regardless of whether the cache line specified by the GPREFETCH instruction has been fetched into the cache memory.

22. A computer program product encoded in at least one computer readable medium for use with a computing device, the computer program product comprising:
computer readable program code embodied in said medium, for specifying a microprocessor configured to process a repeat load string instruction, wherein the repeat load string instruction specifies a string of data bytes in memory to be loaded into an architectural register of the microprocessor, the computer readable program code comprising:
first program code for specifying a memory subsystem, comprising a cache memory; and
second program code for specifying microcode, wherein the microprocessor is configured to invoke the microcode in response to encountering the repeat load string instruction, wherein the microcode includes a series of guaranteed prefetch (GPREFETCH) instructions to fetch into the cache memory a series of cache lines implicated by the string of data bytes specified by the repeat load string instruction;

wherein the microcode further includes an instruction to load a last value from the string of data bytes into the architectural register.

23. The computer program product of claim 22, wherein the at least one computer readable medium is selected from the set of a disk, tape, or other magnetic, optical, or electronic storage medium and a network, wire line, wireless or other communications medium.

* * * * *